C. E. DERR.
GEAR CUTTING MACHINE.
APPLICATION FILED JUNE 25, 1917.
1,372,340.
Patented Mar. 22, 1921.
5 SHEETS—SHEET 1.
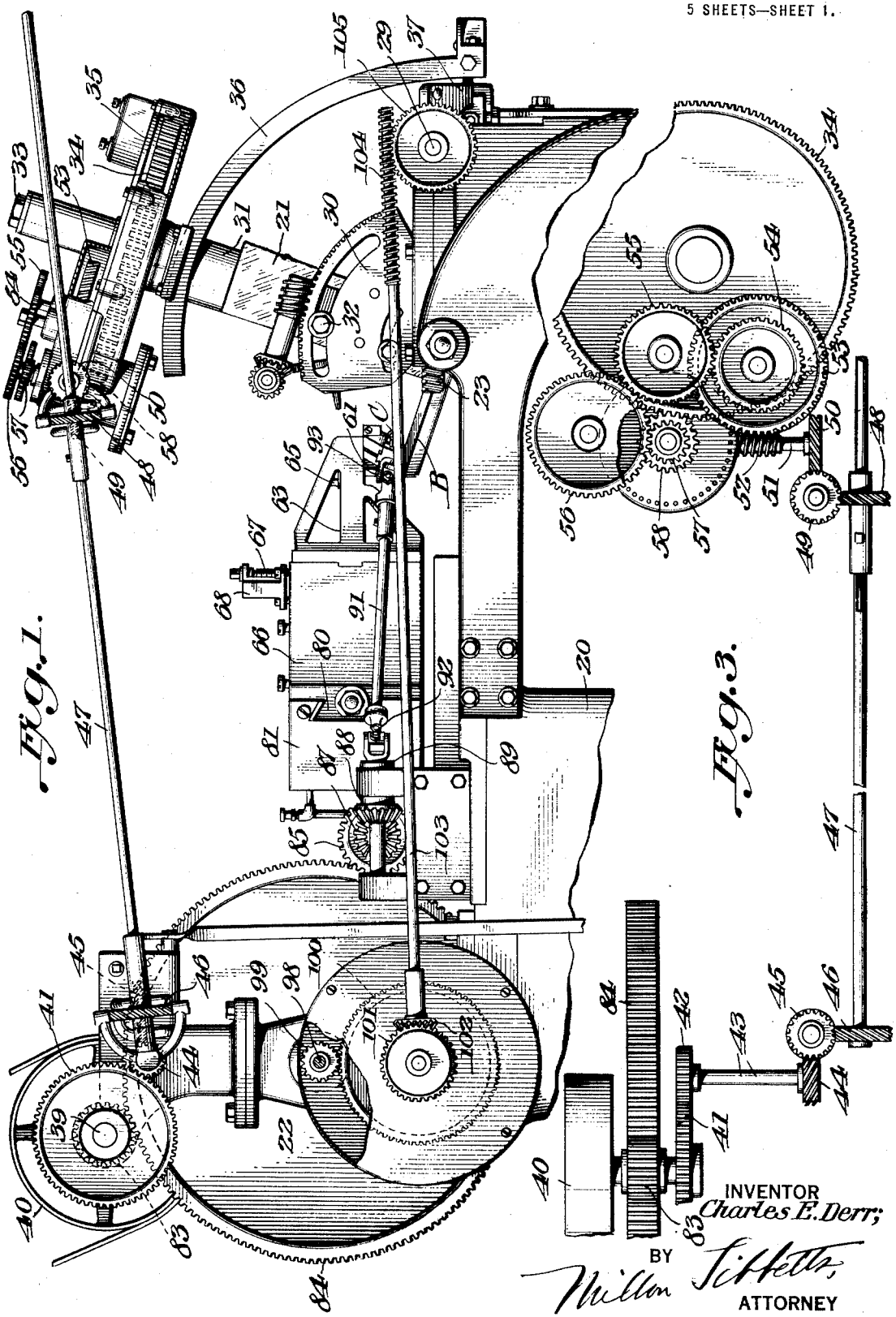
INVENTOR
Charles E. Derr;
BY
Millon Sittetts
ATTORNEY C. E. DERR.
GEAR CUTTING MACHINE.
APPLICATION FILED JUNE 25, 1917.
1,372,340.
Patented Mar. 22, 1921.
5 SHEETS—SHEET 2.
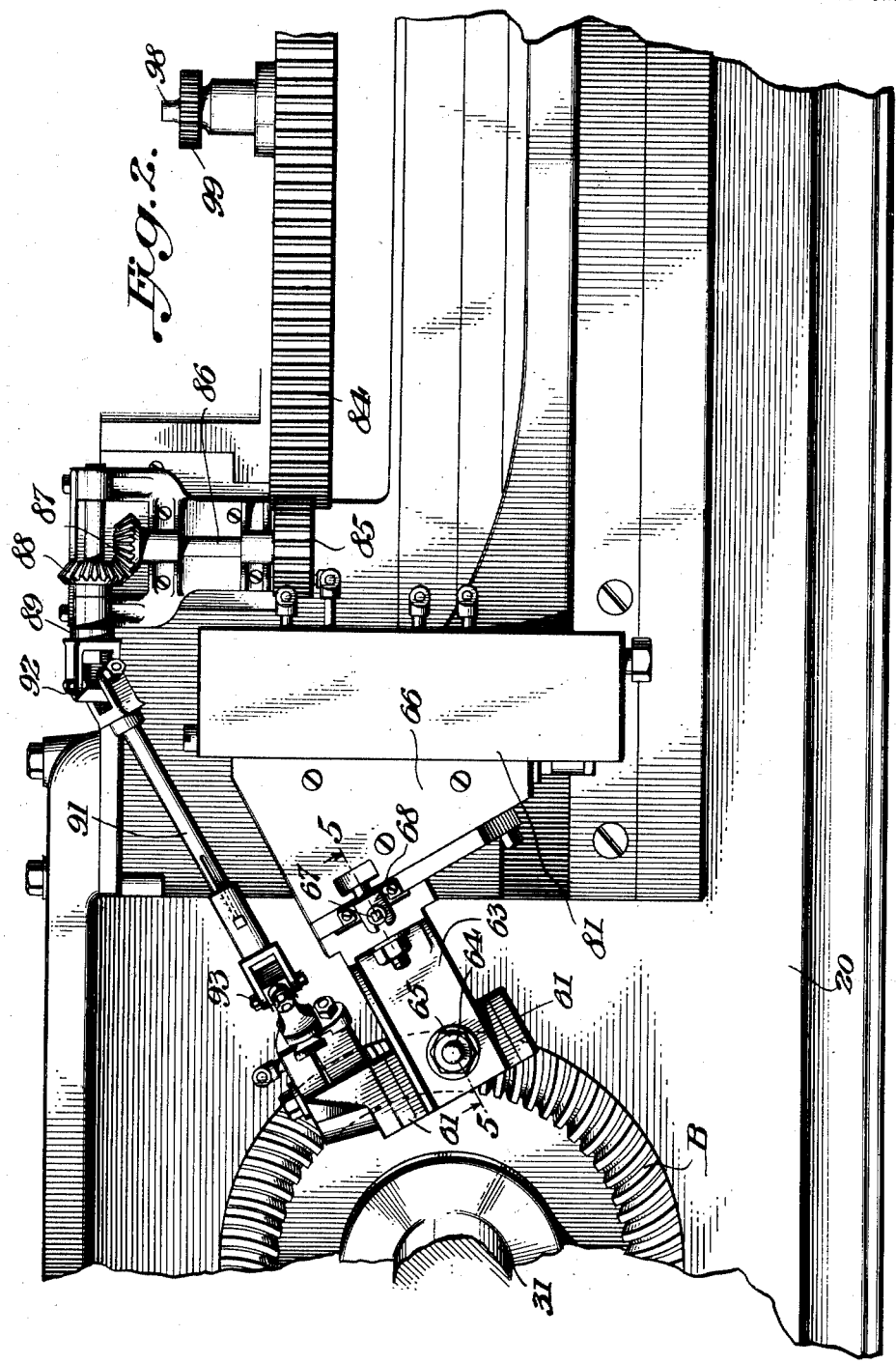
INVENTOR
Charles E. Derr;
BY
ATTORNEY

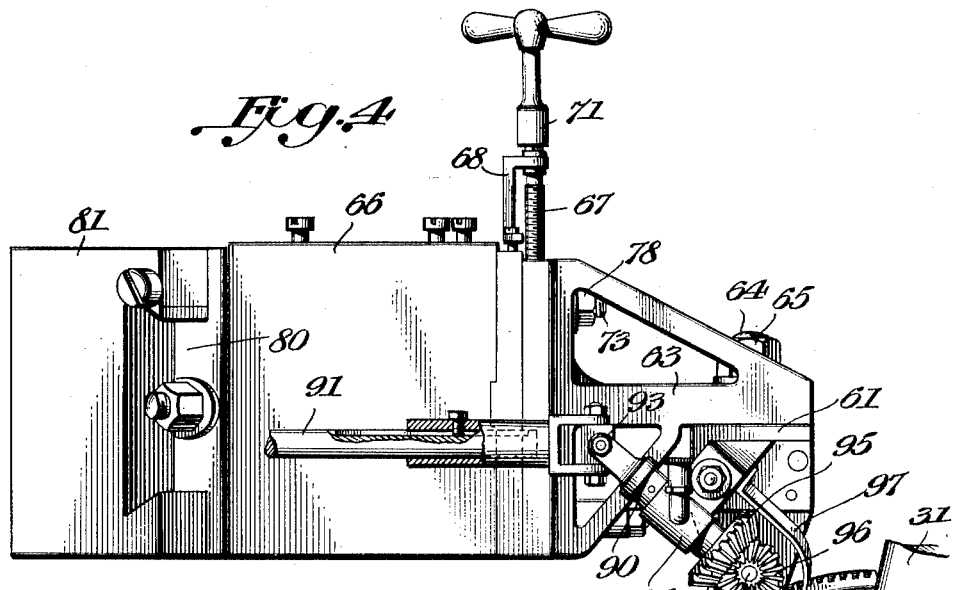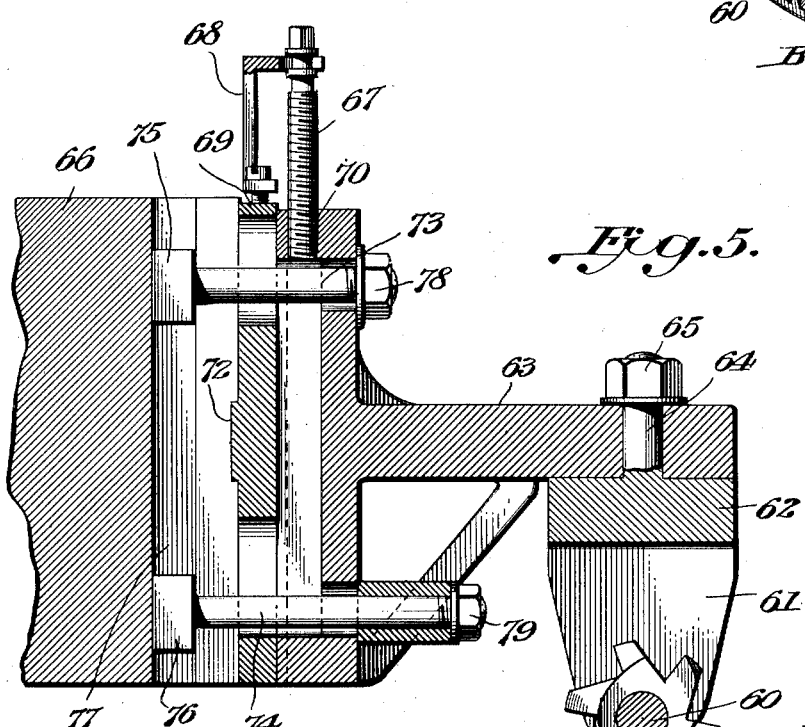

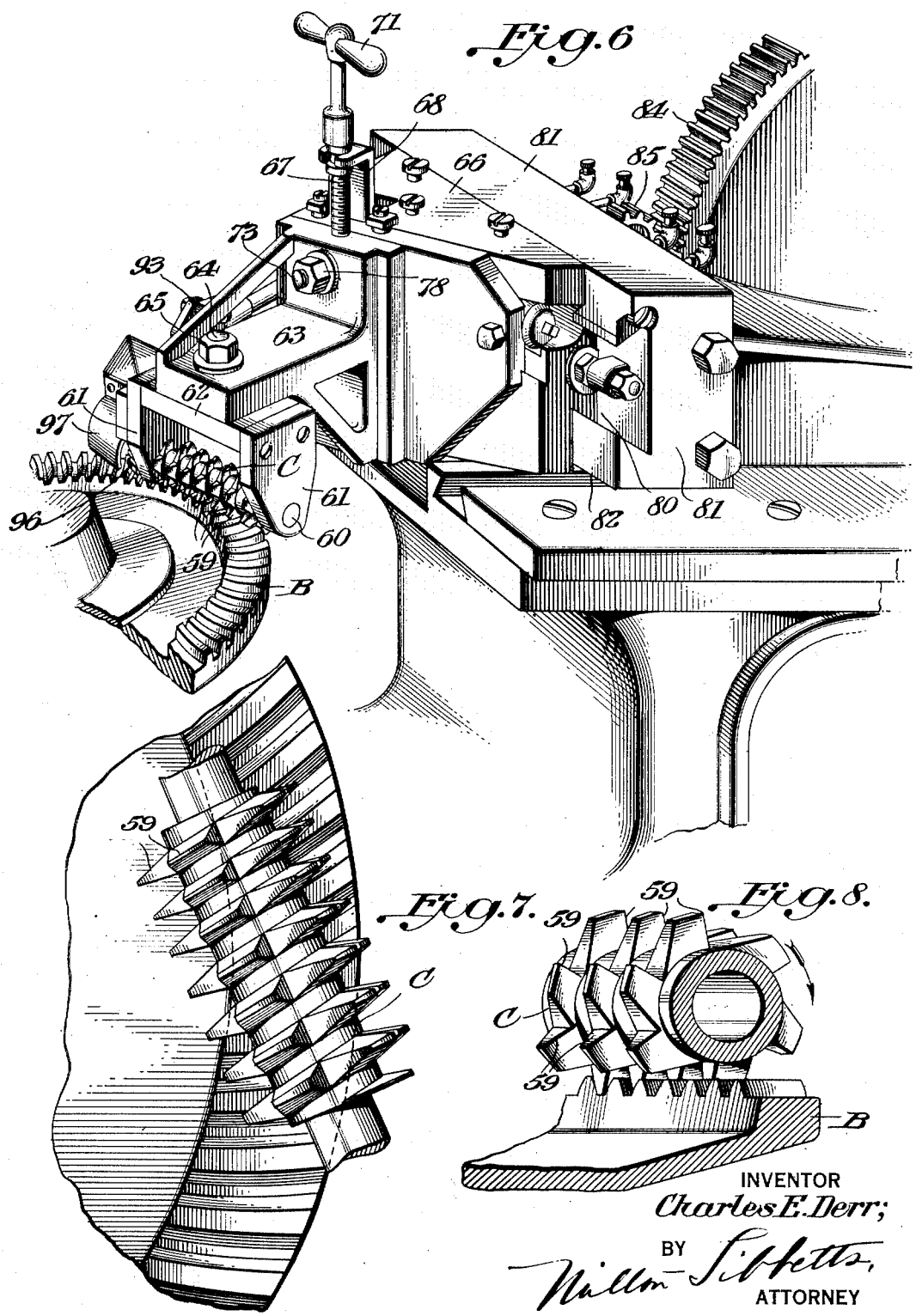

C. E. DERR.
GEAR CUTTING MACHINE.
APPLICATION FILED JUNE 25, 1917.
1,372,340.
Patented Mar. 22, 1921.
5 SHEETS—SHEET 5.
Fig. 9.
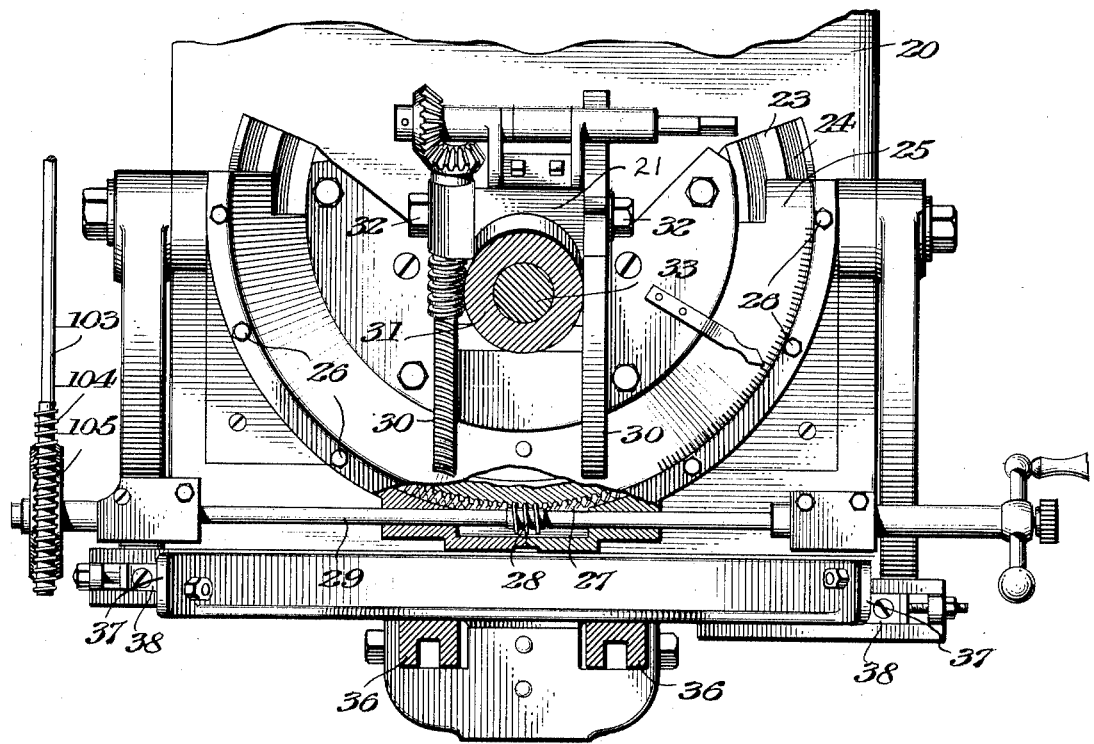
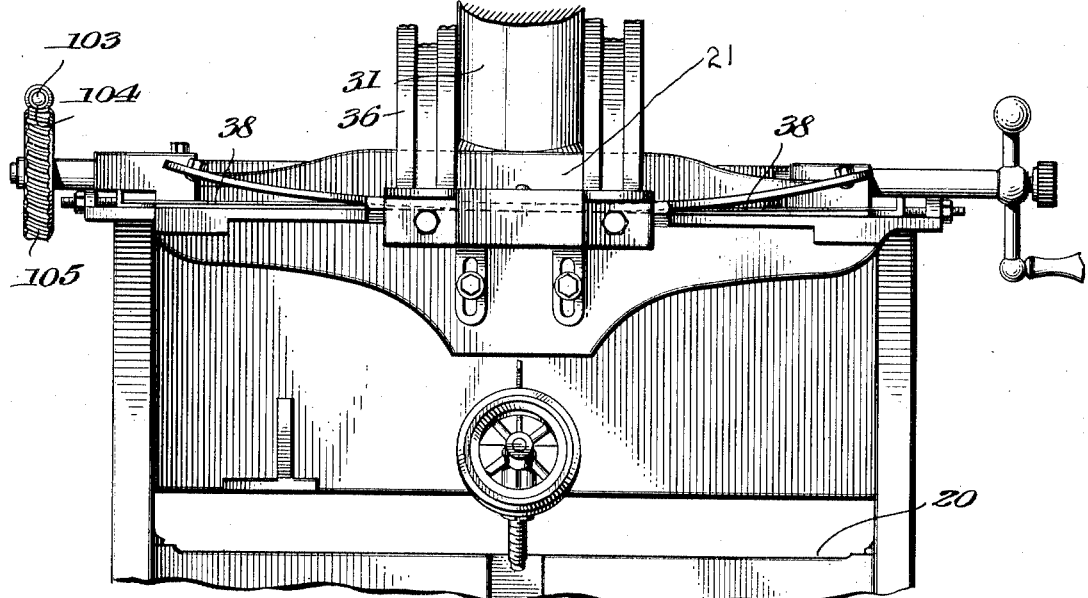
Fig. 10.
INVENTOR
Charles E. Derr;
BY
ATTORNEY

UNITED STATES PATENT OFFICE.

CHARLES E. DERR, OF DETROIT, MICHIGAN, ASSIGNOR, BY MESNE ASSIGNMENTS, TO JAMES E. GLEASON, TRUSTEE, OF ROCHESTER, NEW YORK.

GEAR-CUTTING MACHINE.

1,372,340.   Specification of Letters Patent.   Patented Mar. 22, 1921.

Application filed June 25, 1917. Serial No. 176,745.

*To all whom it may concern:*

Be it known that I, CHARLES E. DERR, a citizen of the United States, and resident of Detroit, Wayne county, State of Michigan, have invented certain new and useful Improvements in Gear-Cutting Machines, of which the following is a specification.

This invention relates to gear manufacture and more particularly to a method of cutting gears having curved teeth, and to machines for carrying out such method. One form of machine for carrying out this method is shown in the accompanying drawings and is hereinafter described.

In the drawings, Figure 1 is a side elevation, with parts in section, of a machine made in accordance with this invention;

Fig. 2 is a plan view of the greater part of the machine shown in Fig. 1;

Fig. 3 is a plan view, somewhat diagrammatically illustrated, of a part of the gearing of the machine shown in Fig. 1;

Fig. 4 is an enlarged side elevation of the cutter device and its supporting and operating mechanism;

Fig. 5 is an enlarged vertical section substantially on the line 5—5 of Fig. 2;

Fig. 6 is a perspective view illustrating the cutter device and its supporting mechanism together with a gear blank supported in operative relation to the cutter device;

Fig. 7 is an enlarged plan view showing the cutter device and a fragmentary part of a gear or gear blank;

Fig. 8 is a vertical sectional view of the cutter device and gear blank;

Fig. 9 is a plan view, partly in section, of the generating mechanism of the machine, and Fig. 10 is an elevation of the mechanism shown in Fig. 9.

In this invention, the method primarily consists in rotating a bevel gear blank and a cutter device synchronously together to progressively cut all of the teeth of the gear blank as distinguished from progressively cutting each tooth separately. One of the objects of the invention is to so cut the teeth, and to thereby produce curved teeth on a bevel gear blank rapidly and accurately and with smooth tooth surfaces.

This invention also contemplates a method of cutting curved teeth on bevel gear blanks in such manner that the material between the teeth may be very rapidly removed by a rough cutting tool to thereby quickly produce a roughed out gear of approximately correct form, which gear may then be finished by any other method or machine and with the exact tooth curvature required for meshing with a particular form of gear or pinion cut by this or any other desired method or machine. This is in recognition of the fact that so far as known at present the method of this invention has its widest application to the type of bevel gears used as the driving gears of automobiles in which the ratio is usually about three or four to one, and the invention is particularly useful in cutting the larger of those driving gears because of the greater number of teeth therein, the saving of time of this invention over previous inventions lying principally in the fact that it is unnecessary to shift the cutter from one tooth to another between cuts.

In other words, this invention is useful both for roughing out gears and for finishing them.

Referring to the drawings, 20 represents the frame or bed of the machine and at the right end thereof in Fig. 1 a supporting means 21 for the gear blank B is mounted. Adjacent the blank B and in operative relation thereto a cutter device C is supported on another part of the frame of the machine. At the extreme left of the machine in Fig. 1 a standard 22 rises from the frame to support the various gears that operate the mechanism.

The blank supporting means 21 above referred to is similar to that used upon the well known Bilgram bevel gear generator and it may be described briefly as follows, referring particularly to Figs. 1, 9, and 10: A plate 23 is mounted upon the flat upper surface of the frame and is formed with a series of circular grooves 24 which fit in corresponding circular flanges of a securing plate 25, which is fastened to the frame as by screws or bolts 26. The circumference of the plate 23 is formed with teeth 27 with which meshes a worm 28 driven by a shaft 29 whereby the plate 23 is rotated or oscillated about a vertical axis which passes through the apex of the former-cone hereinafter described. The plate 23 carries two uprights 30 between which is adjustably held a block or bearing 31, as by bolts 32. Thus this bearing is adjustable about the apex of the former-cone for operation upon different size gears or blanks.

The blank B is removably clamped to an arbor or shaft 33 which operates in the bearing 31, and secured to the arbor adjacent its upper end is a large spur gear 34 surrounded by a housing 35 mounted for relative rotation or oscillation above the bearing 31. This housing 35 is adjustably connected to arc shaped brackets 36 which extend upwardly from the former-cone 37, which is a production of the pitch cone of the blank B. By means of two steel bands 38, each of which has one end attached to the cone 37 and the other to the frame of the machine in such a way that one band prevents slipping of the cone in one direction and the other in the other direction, the said cone is so held that when the grooved plate 23 is oscillated, the cone will assume a motion as of a cone rolling on a plane without slip. Because of the synchronous rotation of the blank and cutter, which will be hereinafter more fully described, the bodily movement of the blank is the same as if the housing 35, of which the said cone is a part, were coupled to the blank arbor 33 and this rolling motion thus transmitted to the blank B imparts to the latter that motion which is necessary to cause the cutter device to generate the proper tooth contour. As a matter of fact however, the housing 35 permits the arbor 33 to rotate freely about its axis, consequently the blank B may be constantly rotated through the medium of the gear 34 above referred to.

Any desired form of mechanism may be employed for rotating the blank B at a constant speed relative to the other operations of the machine. One form of such mechanism is illustrated particularly in Figs. 1 and 3 of the drawings. A driving shaft 39 is mounted at the upper end of the standard 22 and is driven by a pulley 40 from any suitable source of power. A gear 41 on the shaft 39 meshes with a spur pinion 42 on a shaft 43 supported in the standard. Spiral gears 44, 45, and 46 transmit the motion to a shaft 47 and smaller spiral gears 48, 49, and 50 carry it to a shaft 51 mounted in the housing 35. It will be understood that the mounting of these spiral gears is such that the rotary motion is transmitted through the shaft 47 to the shaft 51 regardless of the various changes in position taken by the housing 35 due to its rolling motion above described. The shaft 51 has a worm 52 meshing with a gear 53. The movement of this gear is transmitted through gears 54, 55, 56, 57, and 58 to the gear 34, which as above described, is secured to the shaft 33 upon which the gear blank B is mounted. These gears are preferably so mounted that they may be varied to give different speed ratios as is usual in machines of this character.

The cutter device C is as above stated supported in operative relation to the blank B. It is arranged to rotate continuously in synchronism with the blank and its various cutter teeth operate simultaneously on several different teeth of the blank. In general form the cutter device is a hob, that is its cutting teeth are arranged somewhat as the thread of a screw and the axis of the hob is arranged diagonally across the face of the gear blank so that some of the teeth will cut at the inner ends of the gear teeth while others are cutting at the outer ends and at all intermediate points on the teeth. These cutting teeth are shown at 59 and it will be seen that they are of general wedge shape, having straight sides so that as the gear blank is rolled into them a tooth of proper involute form will be cut.

The cutter device C, it will be understood, is made to operate upon a bevel gear and it has therefore been made of peculiar form in order to attain the desired result of cutting a curved tooth thereon. Its particular angular arrangement with reference to the face of the blank produces a curve to the teeth due to the different parts of the cutter device being at different angles to the respective radii of the blank through which they pass, and the cutter teeth are prevented from cutting away the gear teeth themselves by constant variation of the pitch of the hob from end to end. This is particularly illustrated in Fig. 7. The hob has a single right hand thread in which the lead of the thread decreases from one end to the other. Thus the thread which operates at the outer end of the gear teeth has a greater lead or a steeper pitch than the thread at the other end of the hob and this lead or pitch gradually decreases from the outer end to the inner end of the hob. This decreased lead or tapered pitch of the hob is in direct proportion to the difference in peripheral speed of the outer part of the gear face relative to the inner part thereof.

The cutter device is rotated relatively to the blank at a speed depending upon the number of teeth of the blank and the number of threads of the hob. Thus with a gear blank such as the one shown, having sixty-one teeth, and a single thread hob such as shown, the hob will be rotated sixty-one times to a single rotation of the gear blank. With a greater number of teeth in the blank the hob would be rotated a greater number of times and the same is true if a double or triple thread hob were used. The cutter device C is mounted upon and keyed to a shaft 60 which is supported in bearings in a pair of separated arms 61 on a plate 62 secured to a bracket 63. This plate 62 has an integral stud 64 which extends upwardly through the bracket 63 and a nut 65 clamps the plate in adjusted position. It will be seen that the plate and consequently the cutter device which it carries may be adjusted to a limited extent about the axis of the stud 64.

The bracket 63 is supported upon a block 66 by means that will permit of both vertical and horizontal adjustment. The vertical adjustment is obtained by turning the bolt 67 which is swiveled to an arm 68 on the plate 69 and threaded into the bracket 63 as at 70. By turning the bolt 67, as with a socket wrench 71 shown in Figs. 4 and 6, the bracket 63 may be raised or lowered relative to the plate 69.

The plate 69 may be moved horizontally by reason of its tongue and groove connection 72 with the face of the block 66. The bracket 63 may be secured in its adjusted position by means of bolts 73 and 74 which have heads 75 and 76 respectively adapted to slide in a vertical T groove 77 in the block 66. The nuts 78 and 79 on the outer ends of the bolts are tightened to secure the bracket.

It will be seen that the horizontal adjustment of the bracket 63 along the front face of the block 66 is in an oblique direction substantially parallel to the axis of the shaft 60 upon which the cutter device is mounted. A second horizontal adjustment in a purely transverse direction is also provided in that the block 66 is dovetailed as at 80 into a head 81 which is slidably supported in a longitudinal horizontal groove or slideway 82 on the frame of the machine. The head 81 may also be adjusted in a horizontal plane in its groove and secured in its adjusted position by any suitable means. By these various adjustments the cutter device may be readily positioned with relation to the particular blank which it is intended to operate upon.

Means are provided for rotating the cutter device in synchronism with the rotation of the gear blank. Upon the driving shaft 39 hereinbefore referred to is a pinion 83 which meshes with a large gear 84 suitably supported in the standard 22 above described. The gear 84 meshes with a pinion 85 on a shaft 86 supported on the frame. Bevel gears 87 and 88 connect the shaft 86 with a shaft 89 and the latter shaft drives a shaft 90 through a telescope shaft 91 and universal joints 92 and 93. The shaft 89 is supported in suitable bearings on the frame of the machine and the shaft 90 is supported in a bearing 94 upon the bracket 63 above described. The shaft 90 is connected to drive the shaft 60 of the cutter device by bevel gears 95 and 96. A guard 97 extends over these latter bevel gears to protect the operator therefrom.

It will thus be seen that the drive is effectively carried to the cutter device and by reason of the universally jointed telescope shaft it is not interfered with by the various adjustments of the bracket 63.

The means for feeding or rolling the blank relative to the cutter device is operated through a train of gears from the gear 84 above described. This gear is mounted on a shaft 98 upon which is a pinion 99 meshing with a gear 100. To this latter gear is secured a bevel gear 101 meshing with a bevel pinion 102 on a shaft 103 having a worm 104 at its opposite end. This worm meshes with a worm wheel 105 on the shaft 29 hereinabove described.

It will be understood that the entire mechanism is operated from the driving shaft 39. When this shaft is put in operation by belting the pulley 40 to a source of power, the train of gearing therefrom to the arbor or shaft 33 is put in operation and the gear blank B is rotated slowly. At the same time, the gear 84 and the gearing between it and the shaft 60 is put in operation and the cutter device is rotated rapidly and in synchronism with the rotation of the gear blank. Also the operation of the gear 84 sets the feeding mechanism in operation through the gearing above described and the gear blank is rolled on its pitch surface so that it is fed toward the cutter device until it reaches its full depth and is then rolled away from it.

It will be understood that the axis or shaft 60 about which the cutter C rotates, is stationary during the operation of the machine, said axis being horizontal and oblique with reference to the longitudinal center of the machine, or in other words, with reference to the longitudinal slideway 82. While said shaft 60 is normally stationary, it may receive any one or more of the following five adjustments: First, the angle between said shaft and the direction of the guideway 82 may be varied by swinging the bracket 62 in which said shaft is journaled, about the vertical axis 64. Second, the bracket 63 carrying the bracket 62, may be adjusted vertically up or down, carrying the shaft 60 in a like direction. Third, the plate 69 may be adjusted to carry the shaft 60 in a direction substantially parallel, or in line with, the axis of said shaft. Fourth, the block 66 is adjustable horizontally on the head 81 in a transverse direction, carrying the shaft 60 in a like direction. Fifth, the head 81 itself is adjustable horizontally lengthwise of the guideway 82, so that in this manner the shaft 60 may be brought nearer to or farther away from the path of the blank B.—While the cutter C, as referred to above, rotates about a stationary horizontal axis, which crosses the tooth zone of the blank B, extending from one edge (the inner edge) of said zone to the other (outer) edge, the blank B is simultaneously given a composite rolling motion which consists, first, in a rotation about the inclined axis or spindle 33, and second, in an oscillating motion which carries said spindle to different positions, the axis of said oscillating or partial rotary motion being the vertical axis about which the plate 23 moves. Of course, the several movements are so proportioned that the blank rotates about its axis 33 at least once during such partial rotation of the plate 23, so that every portion of the periphery of the blank will come into engagement with the cutter C. The rolling motion of the blank, produced by the partial rotation of the plate 23, causes the blank to move or roll lengthwise of the cutter in such a way that during half of the arc of contact the cutter comes nearer to the center of the blank, while subsequently the distance between the axes of the blank and of the cutter increases.

I have described but one embodiment of the mechanism for practising my invention. Various modifications may obviously be made without departing from the spirit or scope of this invention as set forth in the appended claims.

Having thus described my invention, what I claim and desire to secure by Letters Patent is:—

1. A method of cutting curved teeth on bevel gear blanks consisting in rotating a blank and a cutter device synchronously together and relatively feeding the blank and cutter device to progressively cut all of the teeth.

2. A method of cutting curved teeth on bevel gears consisting in positioning a hob diagonally across the face of a gear blank, rotating the gear and hob synchronously in contact with each other, and relatively feeding the gear and hob.

3. A method of cutting curved teeth on bevel gears consisting in positioning a hob diagonally across the face of a gear blank, rotating the gear and hob synchronously, and rolling the gear into the hob.

4. A method of cutting curved teeth on bevel gears consisting in rotating a series of cutters about a given axis and in synchronism with a rotating gear blank, the various cutters being caused to operate on different parts of adjacent teeth at the same time.

5. In a machine for cutting gears, in combination, a blank support, a hob having a decreasing lead from one end to the other, and means for rotating the blank and hob.

6. In a machine for cutting gears, in combination, a blank support, a hob having a decreasing lead from one end to the other, and means for rotating the blank and hob in timed relation.

7. In a machine for cutting gears, in combination, a blank support, a hob having a decreasing lead from one end to the other, and arranged diagonally across the face of the blank, and means for rotating the blank and hob.

8. In a machine for cutting gears, in combination, a blank support, a hob having a decreasing lead from one end to the other, means for adjustably supporting said hob in cutting relation to the blank, and means for rotating the blank and hob.

9. In a machine for cutting gears, in combination, a blank support, a hob having a decreasing lead from one end to the other, means for rotating the blank and hob, and means for relatively feeding the blank and hob.

10. A gear cutting machine comprising means for rotatably supporting a cutting element, an oscillating support, a work spindle adjustable to form different angles with the axis about which said support oscillates, and revoluble about said axis of oscillation past the operative path of said cutting element, and means for continuously rotating said cutter element and said spindle during the cutting operation.

11. In a machine for cutting gears, the combination with a blank to be operated upon, of a cutter device in the form of a hob, a bracket stationary during the operation of the machine, for supporting said hob, means for adjusting said bracket vertically and horizontally on the machine, and means for driving said hob including a universally jointed and telescoped shaft.

12. A gear cutting machine comprising means for rotatably supporting a cutting element, an oscillating support, a work spindle adjustable to different angles with the axis about which said support oscillates, and revoluble about said axis of oscillation past the operative path of said cutting element, and means for connecting said cutter element and said spindle operatively for continuous rotation.

13. In a gear cutting machine, means for cutting curved teeth on bevel gear blanks including means for progressively cutting all of such teeth, comprising, in combination, means for supporting a bevel gear blank, a rotary cutter device, the axis of which extends across the face of said blank from one edge of the tooth zone of the blank to the other, means for supporting said cutter device in operative relation to said blank, means for rotating both the gear blank and the cutter device synchronously, and means for relatively feeding the cutter and blank.

14. In a gear cutting machine, means for cutting curved teeth on bevel gear blanks including means for progressively cutting all of such teeth, comprising, in combination, means for supporting a bevel gear blank, a rotary cutter device having a plurality of cutting faces arranged equidistant about its axis of rotation, means for supporting said cutter device in operative relation to said blank, with the axis of the cutter device across the face of the blank from one edge of the tooth zone of the blank to the other, means for rotating both the gear blank and the cutter device synchronously, and means for relatively feeding the cutter and blank.

15. In a gear cutting machine, means for cutting curved teeth on bevel gear blanks comprising, in combination, means for supporting and rotating a gear blank, a rotary cutter device supported in operative relation to said blank with the axis of the cutter device across the tooth zone of the blank, from one edge of such zone to the other having a plurality of cutting faces arranged about its axis of rotation, means for rotating the cutter device in synchronism with the rotation of the blank, and feeding means adapted to relatively feed the cutter and blank to effect a progressive cutting of all of the teeth of the blank.

16. In a machine for cutting curved teeth on bevel gear blanks, in combination, means for supporting a bevel gear blank and rotating it about its axis, a rotary cutter device having cutting means thereon for operating on the bevel gear blank throughout the entire tooth face thereof, and means for rotating the cutter device relative to the gear blank about an axis extending across the face of the blank from one edge of the tooth zone of the blank to the other, so that the direction of movement of the cutting means through the gear blank in cutting the curved teeth is at a greater angle to an element of the cone of the tooth face thereof at the point of cutting adjacent the outer parts of the teeth than it is adjacent the inner parts of the teeth.

17. In a gear cutting machine, in combination, means for supporting and rotating a gear blank, a rotary cutter device having a plurality of cutting faces arranged equidistant about its axis of rotation, and means for rotating the cutter device in synchronism with the blank about an axis maintained in a position across the face of the gear blank from one edge of the tooth zone of the blank to the other to cause the cutting faces to make simultaneous cuts on several adjacent teeth and to respectively operate on different teeth on successive rotations of the cutter device.

18. In a gear cutting machine, in combination, means for supporting and rotating a gear blank, a rotary cutter device having a plurality of cutting faces arranged about its axis of rotation, and means for rotating the cutter device in synchronism with the blank about an axis maintained in a position across the face of the gear blank from one edge of the tooth zone of the blank to the other to cause the cutting faces to make simultaneous cuts on several adjacent teeth and to respectively operate on different teeth on successive rotations of the cutter device.

19. In a machine for cutting curved teeth on bevel gear blanks, in combination, means for supporting a bevel gear blank and rotating it about its axis, a rotary cutter device having cutting means thereon for operating on the bevel gear blank throughout the entire tooth face thereof, and means for rotating the cutter device relative to the gear blank so that the direction of movement of the cutting means through the gear blank about an axis extending across the face of the gear blank from one edge of the tooth zone of the blank to the other in cutting the curved teeth is at a greater angle to an element of the cone of the tooth face thereof at the point of cutting adjacent the outer parts of the teeth than it is adjacent the inner parts of the teeth.

20. A gear cutting machine comprising means for rotatably supporting a cutting element, an oscillating support, a work spindle adjustable to different angles relatively to said axis and to said cutting element, and revoluble about said axis of oscillation past the operative path of said cutting element, and means for continuously rotating said cutting element and said spindle during the cutting operation.

21. The method of cutting bevel gears by hobbing all the teeth co-incidently.

22. A gear cutting machine comprising means for rotatably supporting a cutting element, a support mounted to turn, a work spindle adjustable to different angles with the axis about which said support is adapted to turn, and revoluble about said axis past the operative path of said cutting element, and means for continuously rotating said cutting element and said spindle during the cutting operation.

23. The method of cutting bevel gears by hobbing and generating co-incidently.

24. The method of cutting bevel gears consisting in rotating a cutter element and passing the gear blank thereacross with a rolling motion to generate teeth.

25. The method of cutting bevel gears consisting in rotating a cutter element and passing the gear blank thereacross while rotating.

26. The method of cutting bevel gears by continuous contact of the cutting element with the gear blank.

27. The method of cutting bevel gears by continuous contact of the cutting element with the gear blank throughout the complete and co-incident generation of all the teeth.

28. A gear cutting machine, comprising means for rotatably supporting a cutting element, a support mounted to turn, a work spindle adjustable to different angles with the axis about which said support turns, and revoluble about said axis past the operative path of said cutting element, and means for connecting said cutting element and said spindle operatively for continuous rotation.

29. A gear cutting machine comprising means for rotatably supporting a cutting element, a support mounted to turn, a work spindle adjustable to different angles with the axis about which said support is adapted to turn and also relatively to said cutting element, and revoluble about said axis past the operative path of said cutting element, and means for continuously rotating said cutting element and said spindle during the cutting operation.

30. A gear cutting machine comprising a cutter rotatable about a stationary horizontal axis, means for shifting said cutter lengthwise of its axis, means for swinging said cutter to different positions about a vertical axis, means for shifting said cutter up or down without changing the direction of its axis, means for shifting said cutter obliquely with reference to the direction of its axis, means for shifting the cutter at right angles to the direction of the last-named shifting movement, and means for carrying a blank across the zone of operation of the cutter.

31. The method of cutting gears consisting in rotating a blank continuously and cutting longitudinally curved teeth in the same during rotation.

32. A gear cutting machine comprising means for rotatably supporting a gear blank, means for rotatably supporting a cutter element and maintaining its axis in a position across the face of the blank and means for rotating both blank and cutter at peripheral speeds regulated by the respective number of teeth in said cutter and the teeth to be cut in said blank.

33. A gear cutting machine comprising means for rotatably supporting a gear blank, means for rotatably supporting a cutter element and maintaining its axis in a position across the face of the blank and means for rotating both blank and cutter while maintaining said relative position for at least one complete revolution of the blank at speeds the revolution of which are in adverse ratio to the number of teeth in said cutter and those to be cut in the blank.

34. A gear cutting machine comprising means for rotatably supporting a gear blank, means for rotatably supporting a cutter element and maintaining its axis in a position across the face of the blank from one edge of the tooth zone of the blank to the other, and means for rotating both blank and cutter whereby the individual teeth of the cutter mesh with the individual teeth of the blank.

35. A gear cutting machine comprising means for rotatably supporting a gear blank, whereby it may be rolled over a plane parallel to the pitch circle, means for rotatably supporting and maintaining in a position across the face of the blank from one edge of the tooth zone of the blank to the other a cutter element having cutter members operative in a plane tangential to the pitch plane of the gear blank and in operative contact with said blank continuously during the generation of all the teeth thereon.

36. A gear cutting machine comprising means for rotatably supporting a gear blank whereby it may roll in the plane of its pitch circle, means for rotatably supporting and maintaining in a position across the face of the blank from one edge of the tooth zone of the blank to the other a cutter element operative in a plane tangential to the pitch line of said gear blank, means for continuously rotating said cutter and said blank and means for rolling said blank past the operative position of said cutter whereby teeth are generated co-incidently about the entire face of said blank.

37. A gear cutting machine comprising means for rotatably supporting a cutting element, a drive shaft, a work spindle angularly adjustable to said drive shaft and revoluble thereabout past the operative path of said cutting element and means for continuously rotating said cutter element and said spindle during cutting operation.

38. A gear cutting machine comprising means for rotatably supporting a cutting element, a drive shaft, a work spindle angularly adjustable to said drive shaft and revoluble thereabout past the operative path of said cutting element and means for connecting said cutter element and said spindle to said drive shaft for continuous rotation.

39. A gear cutting machine comprising means for rotatably supporting a cutting element, a drive shaft, a work spindle angularly adjustable in relation to said drive shaft and said cutting element and revoluble thereabout past the operative path of said cutting element and means for continuously rotating said cutter element and said spindle during cutting operation.

40. A gear cutting machine comprising a frame, a work spindle supported from said frame and having means for supporting a gear blank to be cut, a chair horizontally adjustable on said frame, and a toothed cutter element supported from said chair in a position permanently across the face of the blank from one edge of the tooth zone to the other and rotatable in operative relation to said spindle at speeds having ratios to the number of teeth of said cutter element.

41. A gear cutting machine comprising a frame, a work spindle supported from said frame and having means for supporting a gear blank to be cut, a chair horizontally adjustable on said frame, a bracket vertically adjustable on said chair and a toothed cutter element supported from said bracket in a position permanently across the face of the blank from one edge of the tooth zone to the other and rotatable in operative relation to said spindle at speeds having ratios to the number of teeth of said cutter element.

42. A gear cutting machine comprising a frame, a work spindle supported from said frame and having means for supporting a gear blank to be cut, a chair horizontally adjustable on said frame, a bracket vertically adjustable on said chair, a housing horizontally adjustable on said bracket and a toothed cutter element supported from said housing in a position permanently across the face of the blank from one edge of the tooth zone to the other and rotatable in operative relation to said spindle at speeds having ratios to the number of teeth of said cutter element.

43. The method of cutting gears which consists in rotating a cutter about an axis extending across the face of the blank from one edge of the tooth zone to the other and bringing successive portions of the periphery of the blank into operative relation to the cutter by a rolling and rotary motion of said blank while preserving contact of said cutter with said blank.

In testimony whereof I affix my signature.

CHARLES E. DERR.